(12) United States Patent
Raftari et al.

(10) Patent No.: US 6,845,305 B1
(45) Date of Patent: Jan. 18, 2005

(54) ENGINE TORQUE CONTROL FOR A HYBRID ELECTRIC VEHICLE USING ESTIMATED ENGINE TORQUE

(75) Inventors: Abbas Raftari, Northville, MI (US); Deepa Ramaswamy, Canton, MI (US); Jerry D. Robichaux, Tucson, AZ (US)

(73) Assignee: Ford Motor Company, Dearborn, MI (US)

( * ) Notice: Subject to any disclaimer, the term of this patent is extended or adjusted under 35 U.S.C. 154(b) by 101 days.

(21) Appl. No.: 10/065,025

(22) Filed: Sep. 11, 2002

(51) Int. Cl.$^7$ .................................................. G06F 7/00
(52) U.S. Cl. ............................ 701/22; 701/36; 701/99; 701/103; 701/104; 477/2; 477/3
(58) Field of Search ................... 701/22, 36, 70, 701/84, 99, 101, 103, 104, 105; 180/65.2, 65.3; 477/2, 3, 16, 20

(56) References Cited

U.S. PATENT DOCUMENTS

| | | | |
|---|---|---|---|
| 4,197,767 A | * 4/1980 | Leung | .......................... 477/98 |
| 5,434,970 A | 7/1995 | Schiffleger | |
| 5,563,479 A | 10/1996 | Suzuki | |
| 5,612,874 A | * 3/1997 | Schulz et al. | .................. 701/51 |
| 5,713,814 A | 2/1998 | Hara et al. | |
| 5,722,502 A | 3/1998 | Kubo | |
| 5,758,303 A | * 5/1998 | Sugiyama et al. | ............. 701/53 |
| 5,951,614 A | 9/1999 | Tabata et al. | |
| 6,009,965 A | 1/2000 | Takanohashi et al. | |
| 6,022,290 A | 2/2000 | Lyon | |
| 6,026,921 A | 2/2000 | Aoyama et al. | |
| 6,081,042 A | 6/2000 | Tabata et al. | |
| 6,123,163 A | * 9/2000 | Otsu et al. | .................. 180/65.8 |
| 6,164,400 A | 12/2000 | Jankovic et al. | |
| 6,196,344 B1 | * 3/2001 | Tamor | ........................ 180/65.4 |
| 6,233,508 B1 | 5/2001 | Deguchi et al. | |
| 6,260,644 B1 | * 7/2001 | Otsu | .......................... 180/65.3 |
| 6,307,276 B1 | 10/2001 | Bader | |
| 6,408,625 B1 | * 6/2002 | Woon et al. | ................... 60/608 |
| 6,440,038 B1 | * 8/2002 | Holloway | ..................... 477/54 |
| 6,663,535 B2 | * 12/2003 | Holloway | .................... 477/110 |

* cited by examiner

*Primary Examiner*—Richard M. Camby
(74) *Attorney, Agent, or Firm*—Dykema Gossett PLLC; Carlos L. Hanze

(57) ABSTRACT

A system and method for accurate control of engine torque for a parallel/series hybrid electric vehicle (PSHEV) is disclosed. An accurate estimate of engine torque is determined from the generator motor torque of a PSHEV. The estimated engine torque can then be used to control engine torque in a closed loop torque control strategy. The invention comprises at least one controller to receive, process and output torque signals; a first control strategy to determine a modified engine torque signal from at least a desired engine torque signal; and a second control strategy to determine variables for air, fuel and spark from said modified engine torque signal. The first control strategy can include a proportional integral (PI) controller. The estimated engine torque signal can be a function of an estimated generator motor torque signal, a generator motor speed signal and an engine torque loss signal.

6 Claims, 4 Drawing Sheets

ENGINE TORQUE CONTROL FOR A HYBRID ELECTRIC VEHICLE USING ESTIMATED ENGINE TORQUE

FIELD OF INVENTION

The present invention relates generally to an hybrid electric vehicle (HEV), and specifically a strategy for controlling engine torque in an HEV.

BACKGROUND OF THE INVENTION

The need to reduce fossil fuel consumption and emissions in automobiles and other vehicles predominately powered by internal combustion engines (ICEs) is well known. Vehicles powered by electric motors attempt to address these needs. Another alternative solution is to combine a smaller ICE with electric motors into one vehicle. Such vehicles combine the advantages of an ICE vehicle and an electric vehicle and are typically called hybrid electric vehicles (HEVs). See generally, U.S. Pat. No. 5,343,970 (Severinsky).

The HEV is described in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a series hybrid electric vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A parallel hybrid electrical vehicle (PHEV) configuration has an engine (most typically an ICE) and an electric motor that work together in varying degrees to provide the necessary wheel torque to drive the vehicle. Additionally, in the PHEV configuration, the motor can be used as a generator to charge the battery from the power produced by the ICE.

A parallel/series hybrid electric vehicle (PSHEV) has characteristics of both PHEV and SHEV configurations and is sometimes referred to as a parallel/series "split" configuration. In one of several types of PSHEV configurations, the ICE is mechanically coupled to two electric motors in a planetary gear-set transaxle. A first electric motor, the generator, is connected to a sun gear. The ICE is connected to a carrier gear. A second electric motor, a traction motor, is connected to a ring (output) gear via additional gearing in a transaxle. Engine torque can power the generator to charge the battery. The generator can also contribute to the necessary wheel (output shaft) torque if the system has a one-way clutch. The traction motor is used to contribute wheel torque and to recover braking energy to charge the battery. In this configuration, the generator can selectively provide a reaction torque that may be used to control engine speed. In fact, the engine, generator motor and traction motor can provide a continuous variable transmission (CVT) effect. Further, the HEV presents an opportunity to better control engine idle speed over conventional vehicles by using the generator to control engine speed.

The desirability of combining an ICE with electric motors is clear. There is great potential for reducing vehicle fuel consumption and emissions with no appreciable loss of vehicle performance or driveability. The HEV allows the use of smaller engines, regenerative braking, electric boost, and even operating the vehicle with the engine shut down. Nevertheless, new ways must be developed to optimize the HEV's potential benefits.

One such area of HEV development is torque control of the engine, which requires an accurate estimate of engine torque.

HEV systems to control or determine engine torque or motor torque are generally known in the art. For example, Tabata et al., U.S. Pat. No. 5,951,614, teaches an apparatus for controlling an HEV drive system having a transmission disposed between a vehicle drive wheel and an assembly of an engine and a motor/generator, the apparatus including a torque reduction control device for reducing the input torque of the transmission during a shifting action of the transmission.

Bader, U.S. Pat. No. 6,307,276, teaches a method for operating a parallel hybrid electric vehicle, with an internal combustion engine which is connected to a drive shaft via a clutch and a manual transmission, and with a three-phase machine (a traction motor) which is directly coupled with its rotor to a countershaft of the manual transmission and is connected to an electrical energy store (a battery) via a three-phase converter. A time average of the driving torque required during a respective predeterminable travel time interval is determined by a hybrid drive control unit. The power outputs of the internal combustion engine and of the three-phase machine are controlled so that the internal combustion engine outputs driving torque corresponding to the time average determined, and the three-phase machine outputs the difference between the driving torque currently required and the driving torque delivered by the internal combustion engine.

Deguchi et al., U.S. Pat. No. 6,233,508, teaches a system where a target drive torque is calculated based on a detected value for vehicle speed and a detected value for an accelerator pedal depression amount. A generator torque is calculated for a motor based on a battery state of charge (SOC). An engine is controlled to a torque value that achieves a target drive torque and a generator torque as a target engine torque. The motor is controlled to a value that is the difference of a target drive torque and an engine torque estimation value as a target motor torque.

Tabata et al., U.S. Pat. No. 6,081,042, teaches a hybrid drive system for a motor vehicle, wherein a controllable device such as an automatic transmission or a center differential device is disposed between drive wheels of the vehicle and a drive power source consisting of an engine operated by combustion of a fuel, and an electric motor operated with an electric energy, and the engine and/or the electric motor is/are operated for driving the motor vehicle in different running modes. The controllable device is controlled by a control device on the basis of an input torque received by the controllable device. The control device is adapted to estimate the input torque of the controllable device depending upon a currently selected one of the running modes, or effect learning control of the controllable device in different manners corresponding to the different running modes.

The prior art has met the general needs of controlling an HEV's engine. Nevertheless, to fully achieve the goals of an HEV's performance, drivability, and efficiency, a more accurate system for controlling engine torque is needed.

SUMMARY OF INVENTION

Accordingly, the present invention provides a system and method for accurate control of engine torque in a parallel/ series hybrid electric vehicle (PSHEV). An accurate estimate of engine torque is determined from the generator motor for the PSHEV. The estimated engine torque can then be used to control engine torque in a closed loop torque control strategy.

According to the invention, a system and method for controlling engine torque in a parallel/series hybrid electric vehicle utilizes at least one controller to receive, process and output torque signals. A first control strategy embodied within this controller can determine a modified engine torque signal from a signal representing desired engine torque. A second control strategy embodied within the controller can determine variables for air, fuel and spark from the modified engine torque signal. The first control strategy can include use of a proportional integral (PI) controller. The first control strategy can also determine the modified engine torque signal from the desired engine torque signal and an estimated engine torque signal. The estimated engine torque signal can be a function of an estimated generator motor torque signal, a generator motor speed signal and an engine torque loss signal.

The present invention can improve vehicle drivability by providing accurate engine torque control. The present invention can also reduce violations of battery power limits by accurately controlling engine torque.

The present invention can also improve the performance of an active neutral function by accurately controlling engine torque about a point where zero torque is applied to the vehicle drive wheels such as when operation of an air conditioning compressor is desired, but no torque is applied to the vehicle drive wheels.

Other features of the present invention will become more apparent to persons having ordinary skill in the art to which the present invention pertains from the following description taken in conjunction with the accompanying figures.

BRIEF DESCRIPTION OF DRAWINGS

The foregoing advantages, and features, as well as other advantages, will become apparent with reference to the description and figures below, in which like numerals represent like elements and in which.

DETAILED DESCRIPTION

Figure 1:
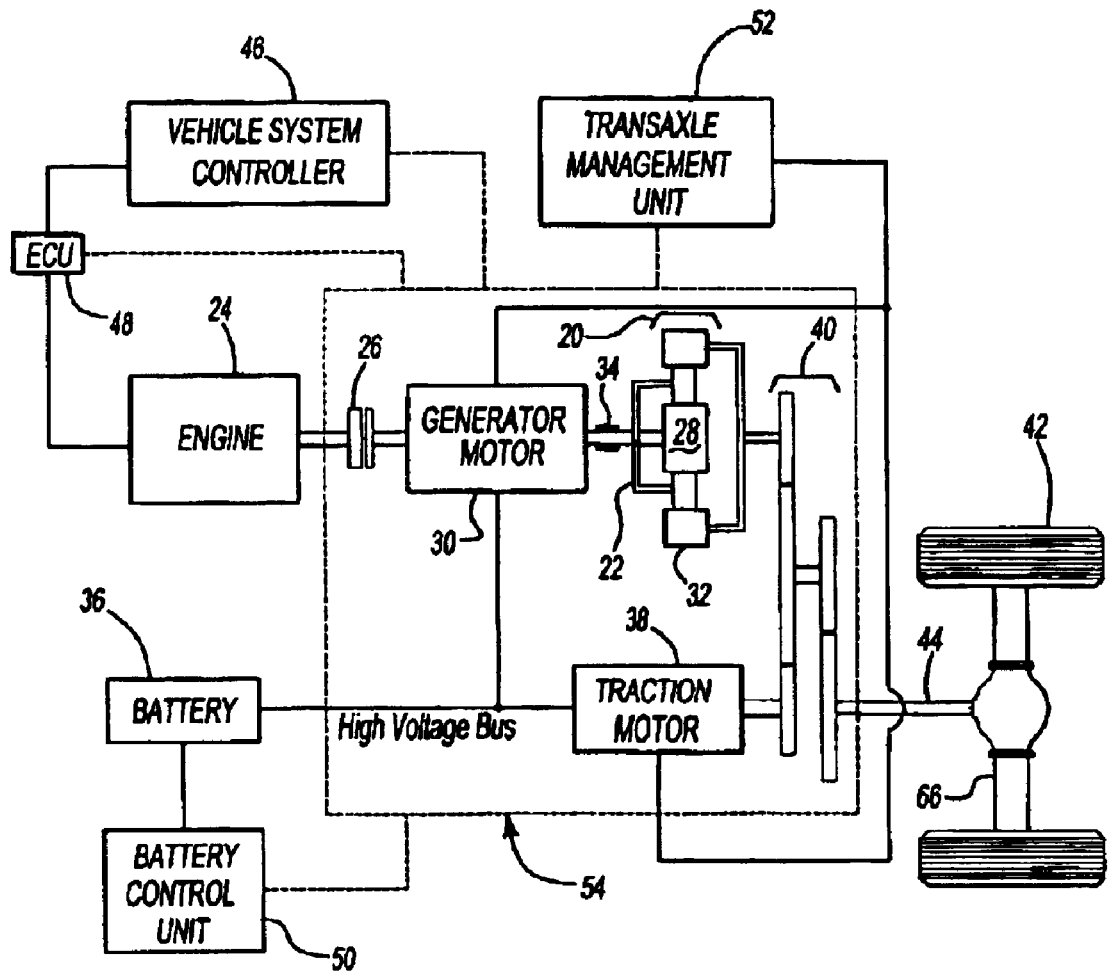
FIG. 1 illustrates a general hybrid electric vehicle (HEV) configuration.

The present invention relates to electric vehicles and, more particularly, hybrid electric vehicles (HEVs). FIG. 1 demonstrates just one possible configuration, specifically a parallel/series hybrid electric vehicle (split) configuration.

In a basic HEV, a planetary gear set 20 mechanically couples a carrier gear 22 to an engine 24 via a one way clutch 26. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44.

The planetary gear set 20, splits the engine 24 output energy into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

A vehicle system controller (VSC) 46 controls many components in this HEV configuration by connecting to each component's controller. An engine control unit (ECU) 48 connects to the Engine 24 via a hardwire interface. The ECU 48 and VSC 46 can be based in the same unit, but are actually separate controllers. The VSC 46 communicates with the ECU 48, as well as a battery control unit (BCU) 50 and a transaxle management unit (TMU) 52 through a communication network such as a controller area network (CAN) 54. The BCU 50 connects to the battery 36 via a hardware interface. The TMU 52 controls the generator motor 30 and the traction motor 38 via a hardwire interface. The control units 46, 48, 50 and 52, and controller area network 54 can include one or more microprocessors, computers, or central processing units; one or more computer readable storage devices; one or more memory management units; and one or more input/output devices for communicating with various sensors, actuators and control circuits.

To efficiently control engine 24 torque, generator motor 30 torque, and traction motor 38 torque, an accurate determination of engine 24 torque is needed. The present invention utilizes a strategy to accurately determine engine 24 torque from generator motor 30 torque. The strategies of the present invention can be in a computer readable format embodied in one or more of the computing devices described above.

To determine an estimated engine 24 torque ($T_{eng\_est}$) from generator motor 30 torque, the following relationship can be used:

$$T_{engesi} = -G_{eng2gen} * (T_{genesi}) - J_{gen+sun} * dw_{gen}/dt) + T_{loss}$$

Where, the following definitions apply:

$T_{eng\_est}$ Estimated Engine 24 Torque;

$G_{eng2gen}$ Gear Ratio from Engine 24 to Generator Motor 30, $G_{eng2gen} = (R+1)/R$.

R Planetary Gear Set 20 Ratio (Ratio of Sun Gear 28 to Ring Gear 32), $R = N_s/N_r$;

$N_s$ Number of teeth on Sun Gear 28;

$N_R$ Number of teeth on Ring Gear 32;

$T_{gen\_est}$ Estimated Generator Motor 30 Torque;

$J_{gen+sun}$ Lumped Moment Inertia of Generator Motor 30 and Sun Gear 28;

$w_{gen}$ Generator Motor 30 Speed; and $T_{loss}$ Engine 24 Torque Loss.

As shown in the above relationship, estimated engine 24 torque is a function of estimated generator motor 30 torque, generator motor 30 speed and engine 24 torque loss.

Figure 2:
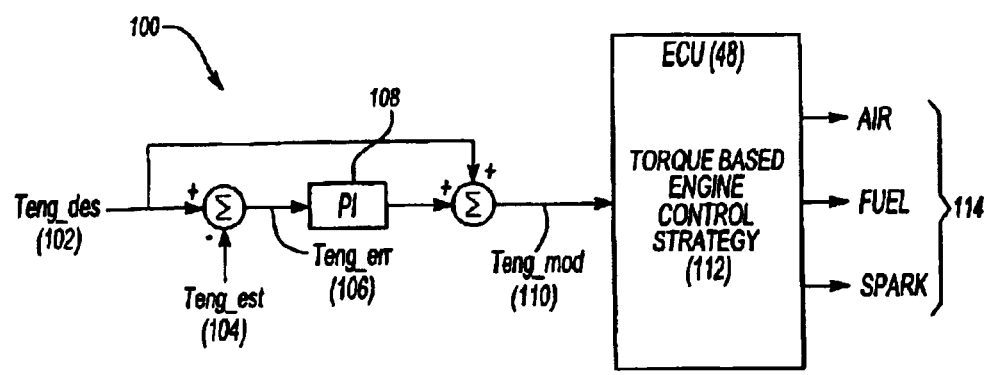
FIG. 2 illustrates an engine torque control strategy using open loop control and closed loop control.

FIG. 2 illustrates an engine 24 torque control strategy, shown generally at 100 using open loop control and closed loop control. In closed loop control, the difference between a desired engine 24 torque ($T_{eng\_des}$) signal 102 and an estimated engine 24 torque ($T_{eng\_est}$) signal 104, calculated using the relationship shown above, are used to create an engine 24 torque error ($T_{eng\_err}$) signal 106. $T_{eng\_des}$ 102 can come from the VSC 46 and is a function of driver demand and other demands placed on the vehicle. The $T_{eng\_err}$ signal 106 can be used by a proportional integral (PI) controller 108, known in the art, to produce a modified engine 24 torque ($T_{eng\_mod}$) signal 110. The $T_{eng\_mod}$ signal 110 is input into the ECU 48, where a torque based engine 24 control strategy 112, known in the art, can use the $T_{eng\_mod}$ signal 110 to calculate variables for fuel, air and spark, shown collectively at 114.

When the vehicle is operating in parallel mode, i.e., both the engine 24 and the traction motor 38 provide torque to the output shaft 44, the estimated generator motor 30 torque ($T_{gen\_est}$) is not available. Therefore, the estimated engine 24 torque ($T_{eng\_est}$) 104 cannot be calculated using the relationship shown above. In this mode, the engine 24 torque control strategy 100 operates in an open loop control mode. In the open loop control mode, the $T_{eng\_mod}$ signal 110 is set equal to the desired engine 24 torque $T_{end\_des}$ signal 102, which is input into the ECU 48 as described above.

To achieve accurate closed loop control, the PI controller 108 is tuned as a function of the accuracy of the estimated engine 24 torque ($T_{eng\_est}$) signal 104, which in turn is a function of the accuracy of the estimated generator motor 30 torque ($T_{gen\_est}$). The accuracy of $T_{gen\_est}$ is a function of the generator motor's 30 operating point, torque, and speed.

Figure 3:
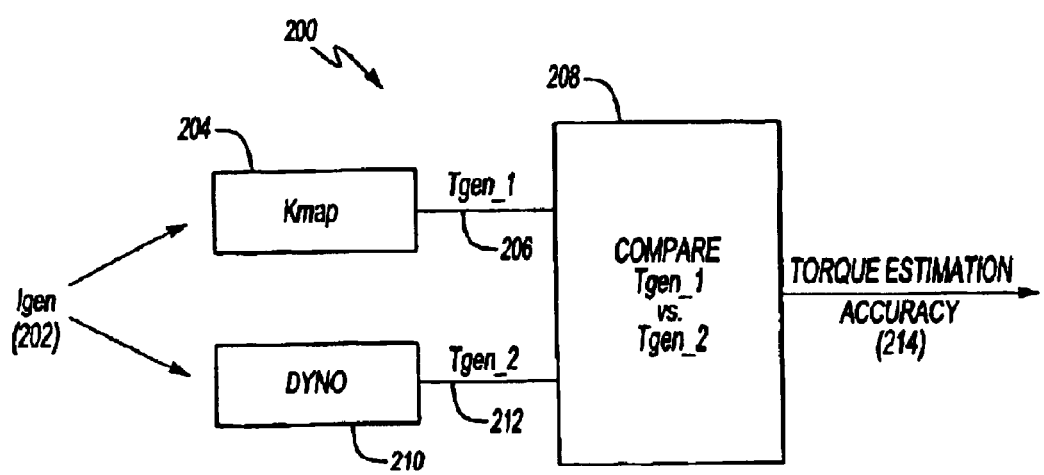
FIG. 3 illustrates a strategy to map generator motor torque estimation accuracy.

FIG. 3 illustrates a strategy to map estimated generator motor 30 torque accuracy using a dynamometer 210. This strategy, shown generally at 200, is accomplished by comparing a transfer function map generated estimate of generator motor 30 torque ($T_{gen\_1}$) 206 to a measured generator motor 30 torque (T gen$_2$) 212. In the strategy 200, a signal for generator motor 30 current ($I_{gen}$) 202 is inputted into a transfer function map ($K_{map}$) 204. The transfer function map 204 outputs a first estimate of generator motor 30 torque* ($T_{gen\_1}$) 206. The same generator motor 30 current ($I_{gen}$) 202 is used to drive the generator motor 30 on a dynamometer 210. The dynamometer 210 can measure actual generator motor 30 torque ($T_{gen\_2}$) 212 and is known in the art. Comparing $T_{gen\_1}$ and $T_{gen\_2}$ at 208 results in a generator motor 30 torque estimation accuracy 214. Trends of the generator motor 30 torque estimation accuracy 214 can be used to schedule the gain (the degree to which the controller adjusts the signal, i.e., how much correction is applied) in the PI controller 108.

Figure 4:
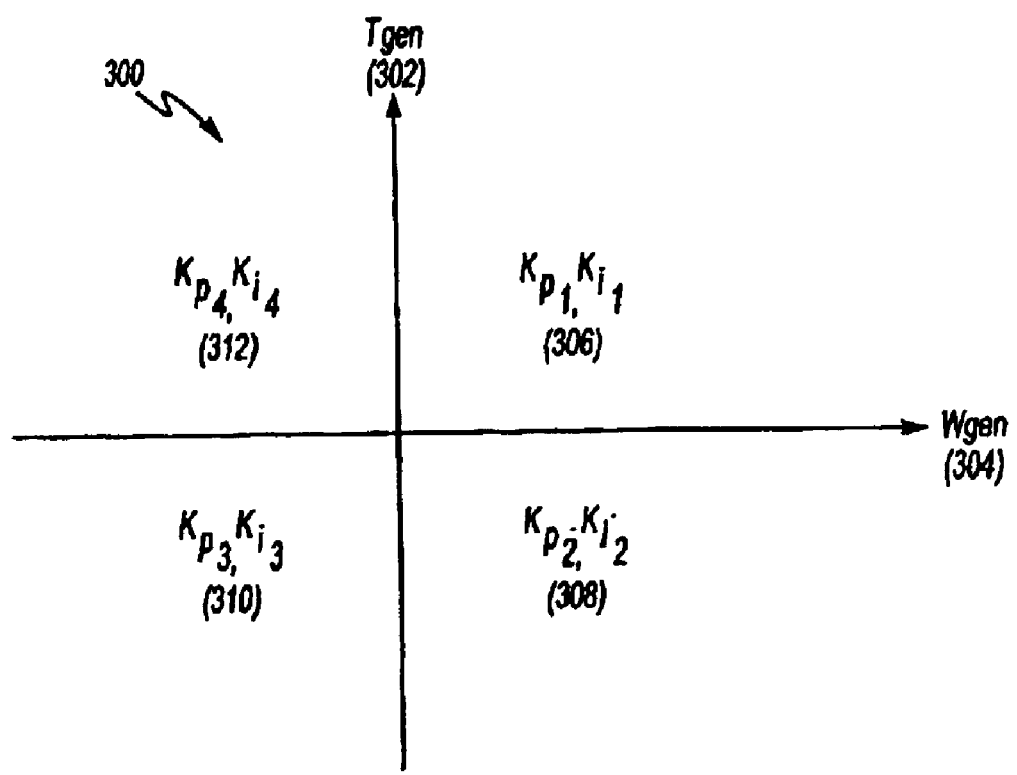
FIG. 4 illustrates a strategy to schedule the gain of a proportional integral controller.

FIG. 4 illustrates a strategy, shown generally at 300, to schedule of the gain of the PI controller 108. The PI controller 108 can be scheduled using the trends of the generator motor 30 torque estimation accuracy 214 as a function of generator motor 30 torque 302 and speed 304. Gain scheduling can be accomplished by choosing different PI controller 108 constants in the regions where the generator motor 30 torque estimation accuracy 214 is different. For example, if the generator motor 30 torque estimation accuracy 214 is roughly constant in each of the four quadrants of generator motor 30 speed 304 versus torque 302, the gains of the PI controller 108 can be chosen as follows:

Positive Speed 304, Positive Torque 302=$Kp_1$, $Ki_1$ 306;
Positive Speed 304, Negative Torque 302=$Kp_2$, $Ki_2$ 308;
Negative Speed 304, Negative Torque 302=$Kp_3$, $Ki_3$ 310; and
Negative Speed 304, Positive Torque 302=$Kp_4$, $Ki_4$ 312.

Where $Kp_n$ and $Ki_n$ are the proportional and integral constants of the PI controller 108.

By following the aforementioned strategies, the task of controlling torque to the drive wheels 42 becomes easier because engine 24 torque is more accurately controlled, which results in improved vehicle drivability. Accurate engine 24 torque control also results in fewer violations of battery 36 power limits, since energy from the battery 36 can be used when torque demand exceeds available engine 24 torque. Lastly, accurate control of engine 24 torque allows the vehicle to perform an active neutral function more easily.

Active neutral is an operating condition where desired drive wheel 42 torque is zero and generator motor 30 torque is commanded to effectively cancel out engine 24 torque. An example of an active neutral condition could be an instance when the engine 24 may need to run an air conditioning compressor, but no engine 24 torque is needed for drive purposes. Accurate engine 24 torque control allows for reduced variation about a point where no torque is applied to the drive wheels 42.

The above-described embodiments of the invention are provided purely for purposes of example. Many other variations, modifications, and applications of the invention may be made.

What is claimed is:

1. A system for controlling engine torque in a parallel/series hybrid electric vehicle, comprising:

a first control strategy embodied within a first controller to determine a modified engine torque signal from at least a desired engine torque signal and an estimated engine torque signal determined from at least an estimated generator motor torque signal; and a second control strategy embodied within a second controller to determine variables for air, fuel and spark from said modified engine torque signal.

2. The system according to claim 1, wherein said first controller comprises a proportional integral (PI) controller.

3. The system according to claim 1, wherein said estimated engine torque signal is further a function of a generator motor speed signal and an engine torque loss signal.

4. A method for controlling engine torque in a parallel/series hybrid electric vehicle, comprising the steps of:

determining an estimated engine torque signal;

determining a modified engine torque signal from at least a desired engine torque signal and said estimated engine torque signal; and determining variables for air, fuel and spark from said modified engine torque signal.

5. The method of claim 4, wherein said an estimated engine torque signal is determined from an estimated generator motor torque signal, from a generator motor speed signal, and from an engine torque loss signal.

6. The method of claim 4, wherein said step of determining a modified engine torque signal from at least a desired engine torque signal and an estimated engine torque signal and comprises the steps of:

determining an engine torque error signal from a difference between said desired engine torque signal and said estimated engine torque signal; and using a proportional integral controller to operatively act upon said engine torque error signal to determine said modified engine torque signal.

* * * * *